United States Patent [19]

Jackson et al.

[11] Patent Number: 5,418,015
[45] Date of Patent: May 23, 1995

[54] PROCESS FOR FORMING A REFRACTORY OXIDE COATING

[75] Inventors: John E. Jackson, Brownsburg, Ind.; Hideo Nitta, Higashi-Matsumaya, Japan; Katoh Shoichi, Okegawa, Japan; Masahiko Amano, Futtsu, Japan; Yasushi Kurisu, Futtsu, Japan; Keiichiro Ohno, Kimitsu, Japan

[73] Assignee: Praxair S.T. Technology, Inc., Danbury, Conn.

[21] Appl. No.: 218,923

[22] Filed: Mar. 28, 1994

Related U.S. Application Data

[62] Division of Ser. No. 967,334, Oct. 28, 1991, Pat. No. 5,304,519.

[51] Int. Cl.$^6$ .............................................. B05D 1/10
[52] U.S. Cl. ...................... 427/452; 427/453
[58] Field of Search ................ 427/453, 452; 501/103, 501/106

[56] References Cited

U.S. PATENT DOCUMENTS

| | | | |
|---|---|---|---|
| 2,101,947 | 10/1939 | Kinzie | 106/9 |
| 3,100,154 | 8/1963 | Oshima et al. | 105/57 |
| 4,124,737 | 11/1978 | Wolfla et al. | 428/640 |
| 4,421,799 | 12/1983 | Novinski | 427/453 |
| 4,579,879 | 4/1986 | Garvie | 501/106 |
| 4,599,270 | 7/1986 | Rangaswamy et al. | 427/453 |
| 4,822,689 | 4/1989 | Fukubayashi et al. | 428/472 |
| 4,996,117 | 2/1991 | Chu et al. | 428/633 |
| 5,106,794 | 4/1992 | Oizume et al. | 501/103 |

FOREIGN PATENT DOCUMENTS

| | | |
|---|---|---|
| 643942 | 4/1981 | Japan . |
| 57-39311 | 8/1982 | Japan . |
| 118145 | 11/1982 | Japan . |
| 60-22047 | 5/1985 | Japan . |
| 61-11726 | 6/1986 | Japan . |
| 6326183 | 6/1986 | Japan . |
| 6350428 | 4/1987 | Japan . |
| 63-33162 | 2/1988 | Japan . |
| 6333156 | 2/1990 | Japan . |
| 1199483 | 7/1970 | United Kingdom . |
| 668925 | 6/1979 | U.S.S.R. . |

*Primary Examiner*—Karl Group
*Attorney, Agent, or Firm*—Cornelius F. O'Brien

[57] ABSTRACT

A thermal spray powder feed coating composition composed of stabilized zirconia mixed with zircon and a selected oxide, such as yttria, to form a refractory oxide coating ideally suited for hearth rolls for annealing steel. Process for producing the coating and the coated article so produced is also disclosed.

11 Claims, 1 Drawing Sheet

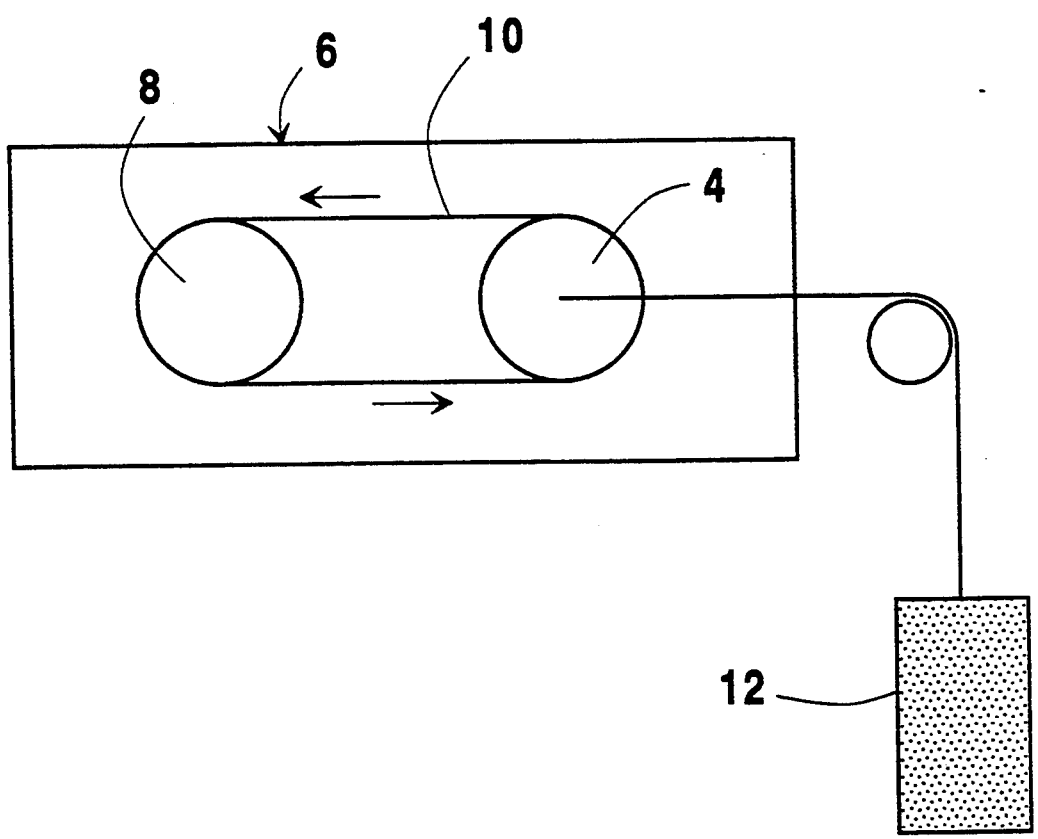

PROCESS FOR FORMING A REFRACTORY OXIDE COATING

This application is a Division of prior U.S. application Ser. No. 07/967,334, Filing Date Oct. 28, 1992, now U.S. Pat. No. 5,304,519.

FIELD OF THE INVENTION

The invention relates to a thermal spray powder feed coating composition composed of stabilized zirconia mixed with zircon and oxide particles to form a refractory oxide coating. The invention also relates to a process for producing the coating and the coated article so produced.

BACKGROUND OF THE INVENTION

This invention is related to the problem of providing a high wear, pick-up, and thermal shock resistant coating for hearth rolls for annealing steel, stainless steel and silicon steel sheet in a continuous annealing furnace. The hearth rolls carry the steel sheet through the furnace. The temperature in the furnace may vary from about 1500° to over 2000° F. depending upon the type of steel, the travel speed of the sheet steel as it passes through the furnace and the duration of time in the furnace.

A major problem encountered in the annealing operation is the transfer or pick-up of material from the steel sheet to the hearth rolls. If pick-up occurs, it will accumulate on the hearth rolls and damage the steel sheet being processed. To avoid this problem frequent roll changes are required with concomitant costs for replacement and lost production. This problem has become more severe in recent years since higher speeds and temperatures are being used to increase productivity.

To suppress the transfer of material to the hearth roll and to increase wear resistance, it is desirable to coat the hearth roll with a coating composition which is substantially chemically inert at elevated temperatures. An undercoating of metal or a ceramic-metal alloy is used to prevent spalling when there is an excessive mismatch in thermal expansion between the coating and the substrate. Spalling may also be prevented using a graded or multilayer under-coating in which the composition of the undercoat is gradually varied from 100% alloy to 100% ceramic.

Japanese Patent No. 563-26183 discloses a hearth roll coated with zirconia partially stabilized by yttria. This coating has good pick-up resistance and thermal shock resistance, but is difficult to produce with high density and good wear resistance. Japanese Patent No. 563-50428 discloses zirconia containing silica as a coating for hearth rolls. However, this costing exhibits excessive pick-up and microspalling.

U.S. patent application Ser. No. 596,896, filed on Oct. 11, 1990, discloses a feed powder composition for use as a coating for hearth rolls which comprises particles of zirconium silicate (zircon) and particles of stabilized or partially stabilized zirconia. During the thermal deposition of the feed powder, the zircon is deposited as zircon and/or its decomposition products $SiO_2$ and $ZrO_2$.

It is an object of this present invention to provide a refractory oxide coating for use on hearth rolls that will have high thermal shock resistance, superior wear resistance, and excellent resistance to pick-up.

It is another object of the present invention to provide a refractory oxide coating for use on hearth rolls that will exhibit good crystallographic characteristics when subject to thermal cycling environments.

It is another object of the present invention to provide a process for producing a refractory oxide coating ideally suitable for use on hearth rolls for annealing steel.

SUMMARY OF THE INVENTION

The invention relates to a thermal spray powder composition comprising particles of zircon ($ZrSiO_4$) with at least one stabilizing oxide selected from the group consisting of calcia (CaO), yttria ($Y_2O_3$), magnesia (MgO), ceria ($CeO_2$), hafnia ($HfO_2$) and a rare earth oxide, and particles of zirconia at least partially stabilized with at least one oxide selected from the group consisting of calcia, yttria, magnesia, ceria, hafnia and a rare earth oxide. Preferably, the oxide combined with the zircon is yttria and the stabilizing oxide in the zirconia is either yttria or calcia.

The term rare earth oxide shall mean at least one oxide selected from the group consisting of lanthanium (La), cerium (Cs), praseodymium (Pr), neodymium (Nd), promethium (Pm), samarium (Sm), europium (Eu), gadolinium (Gd), terbium (Tb), dysprosium (Dy), holmiun (Ho), erbium (Er), thallium (Tm), ytterbium (Yb) and lutecium (Lu).

The invention also relates to a process for forming a pick-up, wear and thermal shock resistant refractory coating on a substrate which comprises the steps:

a) forming a powder feed by mixing particles of zircon combined with at least one selected oxide from the group consisting of calcia, yttria, magnesia, ceria, hafnia and a rare earth oxide, with particles of zirconia at least partially stabilized with at least one stabilizing oxide selected from the group consisting of calcia, yttria, magnesia, ceria, hafnia and a rare earth oxide to form a substantial homogeneous mixture; and b) thermally depositing said powder feed of steps a) onto a substrate to form a coating composed of $ZrO_2$ substantially in the cubic and tetragonal phase along with its stabilizing oxide, zircon, and the selected oxide combined with the zircon.

As used herein zircon shall mean $ZrSiO_4$ and/or its decomposition products $SiO_2$ and $ZrO_2$. Substantially in the cubic and tetragonal phases shall mean such phases being present in the $ZrO_2$ in an amount greater than 50%.

When zircon is thermally sprayed, a portion is taken into the molten state. During the rapid cooling that occurs during decomposition, $ZrO_2$ and $SiO_2$ may precipitate before the $ZrSiO_4$ can form. Thus the splats in the coated structure that are derived from the $ZrSiO_4$ powder could be composed of grains of $ZrO_2$ and $SiO_2$ as well as $ZrSiO_4$.

The zirconia component of the coating contains substantial amounts of stabilized cubic and/or tetragonal phases. Stabilized cubic and/or tetragonal phases shall mean such phases that remain in the cubic and/or tetragonal phases after being heated to 500° C. The presence of unstabilized phases which may transform to the monoclinic phase would be detrimental to the stability of the coating. Therefore, the zirconia component must consist of appropriate amounts of yttria, calcia, or other stabilizing oxides.

It is believed that when calcia is used to stabilize the zirconia component of the powder feed and the coating is exposed to an environment containing iron or oxides of iron, the calcia may, over a long period of time, react with the iron and/or iron oxides. This may destabilize the zirconia and foster the transformation from the cubic or tetragonal phase of the zirconia to the monoclinic phase. Thus, after long exposure at elevated temperature, for example 500 hours at 950° C., coatings of this invention typically contain greater than 50 percent cubic plus tetragonal zirconia when calcia is used to stabilize the zirconia component and greater than 60 percent when yttria is used. However, coatings containing calcia stabilized zirconia tend to be more resistant to pick-up than those containing yttria stabilized zirconia.

The powder feed composition of this invention comprises zirconia combined with a selected oxide in a mixture with particles of zirconia stabilized or partially stabilized with an oxide selected from the group consisting of $Y_2O_3$, CaO, MgO, $CeO_2$ and $HfO_2$. The powder feed composition should comprise 30 to 90, preferably 50 to 70, wt. % stabilized zirconia with the remainder substantially zircon and the selected oxide. As used herein, stabilized zirconia is fully or partially stabilized zirconia with partially stabilized zirconia being preferred. When yttria is used to stabilize the zirconia component it should be present in the range of 1 to 20, preferably 5 to 15, wt. % of the zirconia component. When calcia is used to stabilize the zirconia component it should be present in the range of 2 to 10, preferably 3 to 7, wt. % of the zirconia component. The selected oxide should be present in an amount of 1 to 20 wt. % of the zircon-oxide composite, preferably in an amount from 5 to 15 wt. % and most preferably about 10 wt. %.

BRIEF DESCRIPTION OF THE DRAWING

The single FIGURE is a schematic representation of the equipment used to test the propensity of an as-deposited coating on a hearth roll for pick-up of iron or oxides of iron under dynamic conditions.

DESCRIPTION OF THE PREFERRED EMBODIMENT

The present invention is based upon the discovery that a starting powder feed composition comprising of a mixture of zircon and a selected oxide which is further mixed with zirconia that is stabilized with a stabilizing oxide such as yttria, ceria, hafnia, calcia, or magnesia, may be thermally sprayed to form a coating possessing the characteristic of being resistant to thermal shock, resistant to wear and resistant to pick-up of iron or iron oxides from steel sheet in a continuous annealing line. Any conventional thermal spray technique may be used to form the coating including detonation gun deposition means, high velocity oxy-fuel means and plasma spray deposition means. The chemical composition of the thermally sprayed coating should consists of a mixture of about 30 to 90 wt. % stabilized zirconia which is stabilized by an oxide selected from the group consisting of calcia, yttria, magnesia, ceria, and hafnia with the balance being zircon and/or its decomposition products silica and zirconia and a selected oxide. The preferred proportions of the components in the coating is 50 to 70 wt. % stabilized or partially stabilized zirconia, and the balance being zircon and/or its decomposition products silica and zirconia along with a selected oxide such as yttria. The stabilizer for the zirconia should be between 2 and 20 wt. % of the zirconia component and the selected oxide for the zircon should be between about 1 to 20 wt. % of the zircon component. Zircon can be combined with the selected oxide prior to mixing with the zirconia component in several ways. Preferably, the particles of zircon or the selected oxide could be treated to provide an adhesive coating on their surfaces so that when the selected oxide particles, such as yttria, are mixed with the zircon particles, they will adhere to the outer surface of the zircon. Most preferably, the particles of zircon should be treated with an adhesive layer. Since the oxide particles, such as yttria, are smaller in size than the zircon particles, they will adhere around the surface of the zircon particles forming a coating like layer of oxide on the zircon particles. Alternative methods of combining the selected oxide with zircon include (a) melting the selected oxide and zircon together, casting the melt, and crushing the cast material into powder, and (b) blending very finely divided powder of the selected oxide and zircon together, sintering the blend and crushing the sintered material into powder. Either of these methods will yield a powder with the selected oxide distributed substantially uniformly throughout the zircon powder grains. The stabilized zirconia can then be mixed with the oxide coated zircon particles and thermally sprayed onto a surface of a substrate, such as a metal substrate. As stated above, during the deposition of the feed powder, zirconia and silica could precipitate before zircon could form to any significant extent. Thus the coating will contain splats of the stabilized zirconia and splats derived from the zircon which could contain zirconia and silica and/or zircon. The selected oxide attached to the zircon particles will be present in the zircon splats and it is believed that they will act as a stabilizer for zirconia present in the splats. The coating so produced will have good thermal shock resistance, excellent wear resistance and increased resistance to pick-up.

The coatings of this invention are preferably applied by detonation gun deposition or plasma spray deposition. A typical detonation gun consists essentially of a water-cooled barrel which is several feet (1 m) long with an inside diameter of about 1 inch (25 mm). In operation, a mixture of oxygen and a fuel gas, e.g., acetylene, in a specified ratio (usually about 1:1) is fed into the barrel along with a charge of coating material in powder form. The gas is then ignited and the detonation wave accelerates the powder to about 2400 ft./sec. (730 m/sec.) while heating the powder close to or above its melting point. After the powder exits the barrel, a pulse of nitrogen purges the barrel and readies the system for the next detonation. The cycle is then repeated many times a second.

The detonation gun deposits a circle of coating on the substrate with each detonation. The circles of coating are about 1 inch (25 mm) in diameter and a few ten thousandths of an inch (several microns) thick. Each circle of coating is composed of many overlapping microscopic thin lenticular particles or splats corresponding to the individual powder particles. The overlapping splats interlock and bond to each other and the substrate without automatically alloying at the interface thereof. The placement of the circles in the coating deposit are closely controlled to build-up a smooth coating of uniform thickness and to minimize substrate heating.

In the plasma arc spray process, an electric arc is established between a non-consumable electrode and a second non-consumable electrode spaced therefrom.

Gas is passed in contact with the non-consumable electrode such that it contains the arc. The arc-containing gas is constricted by a nozzle and results in a high thermal content effluent. The powders used to produce the coating are injected into the effluent nozzle and are deposited onto the surfaces to be coated. This process, which is described in U.S. Pat. No. 2,858,411, produces a deposited coating which is dense and adherent to the substrate. The applied coating also consists of irregularly shaped microscopic splats or leaves which are interlocked and bonded to one another and also the substrate.

In general the coating composition for the plasma arc spray process will be substantially equivalent to its corresponding starting material composition. When using the detonation gun to apply the coating, evaporation of some of the components of the powder feed may result in a significantly different ratio of constituents in the as-deposited coating. Thus some change in chemistry may occur during deposition, using any thermally sprayed process. Such changes can be compensated for by adjusting the powder composition or deposition parameters.

Because of the complex phase diagram for Zr—Si—O, the solidifying zircon powder particles may contain $ZrSiO_4$ as a crystallographic phase and/or $ZrO_2 + SiO_2$ as the decomposition products of the molten $ZrSiO_4$ in separate crystallographic phases within individual splats. Thus the $ZrO_2$ and $SiO_2$ are intimately associated within each splat which had previously been $ZrSiO_4$ in the powder form. By "associated" is meant the extremely fine and intermixed crystalline structure of $SiO_2$, $ZrO_2$ and/or $ZrSiO_4$ crystallites within the splat. Also deposited within the zircon splats will be dispersed particles of the selected oxide, such as $Y_2O_3$, although some or most of the selected oxide may be dissolved in the zirconia constituent within the zircon splat.

Although the coatings of the present invention are preferably applied by detonation or plasma spray deposition, it is possible to employ other thermal techniques such as, for example, high velocity combustion spray (including high velocity oxy-fuel or hypersonic jet spray), flame spray and so called high velocity plasma spray methods (including low pressure or vacuum spray methods). Other techniques can be employed for depositing the coatings of the present invention as will readily occur to those skilled the art.

The thermal spray coating may be applied directly to the metal substrate. However, an undercoat compatible with the substrate and resistant to oxidation is preferred. An undercoat of a metallic or ceramic alloy, such as a ceramic-metal alloy mixture having a cobalt-based metal matrix containing alumina is preferred. For example, ceramic alloy of a cobalt based metal matrix comprising CO—Cr—Al—Ta—Y and $Al_2O_3$ can be used. Optimum undercoatings are cobalt-based alloys with alumina dispersions as described in U.S. Pat. No. 4,124,737, the disclosure of which is herein incorporated by reference. Suitable substration for use in this invention are iron, nickel, or cobalt-based alloys with alloy steels being preferred.

EXAMPLE 1

To simulation conditions for pick-up of iron or iron oxide from a steel sheet, a coated sample roll 4 as shown in the drawing was placed in a furnace 6 and spaced apart from a second roll 8. A closed loop steel sheet 10, containing $Fe_3O_4$ or Fe powder, was then fed over the rolls 4–8 in a continuous operation so that the $Fe_3O_4$ or Fe powder contacted the surface of the coated sample roll 4. A force or tension of a 2 $kg/mm^2$ load 12 was connected to the coated roll 4 to exert pressure on the roll so that good contact could be maintained between the hearth roll 4 and steel sheet 10. The hearth roll 4 was rotated at 40 revolutions per minute in an atmosphere of 98% nitrogen and 2% hydrogen. The furnace was heated 10° C. per minute until it reached 950° C. and then was maintained at 950° C. for 30 minutes. Thereafter, the furnace was cooled at 10° C. per minute. Various coated sample rolls were used in the test and the pickup data are shown in Table 1.

TABLE I

| Sample* | Coating on Roll | Fe Pickup | $Fe_3O_4$ Pickup |
| --- | --- | --- | --- |
| 1 | 50 ($ZrSiO_4$ + 10% $Y_2O_3$) + 50 ($ZrO_2$.14% $Y_2O_3$) | 0% | 0% |
| 2** | 50 ($ZrSiO_4$ + 10% $Y_2O_3$) + 50 ($ZrO_2$.14% $Y_2O_3$) | 0% | 0% |
| 3** | $ZrSiO_4$ (Comparison) | 0% | 0.07% |
| 4** | $Al_2O_3$ + CoAl (Comparison) | 0% | 0.13% |
| 5** | 50 ($ZrSiO_4$ + 10% $Y_2O_3$) + 50 ($ZrO_2$.5% CaO) | 0% | 0% |

*All sample substrates were austenitic stainless steel. Samples 1 and 2 had an undercoat consisting of a cobalt-base alloy with about 50 volume percent alumina about 0.1 mm thick. The outer coatings were about 0.06 mm thick.
*Test was conducted after the coated roll was exposed to 950° C. while being contacted to $Fe_3O_4$ for 30 minutes in 98% $N_2$-2% $H_2$. Samples 1 and 2 of this invention showed no iron or iron oxide pick-up after the two-roll simulator test.

EXAMPLE 2

Coated samples having the coating composition as shown in Table 2 were held in contact with $Fe_3O_4$ powder using a force of 6 kg. The coated samples were heated to 600° C. while being contacted to $Fe_3O_4$ in an atmosphere of 98% $N_2$-2% $H_2$ and then cooled to ambient. This thermal cycle test was repeated 20 times and after each cycle the surface of the coated roll was examined. Some samples were heated to 950° C. while being contacted to $Fe_3O_4$ in 98% $N_2$-2% $H_2$ and held at this temperature for a period of time (shown in Table 2) before being subjected to the thermal cycle test. The results of these test are shown in Table 2. The data observed clearly indicates that the coated samples of this invention (Samples 4 and 5) did not have any spalling even after Sample 5 roll was heated at 950° C. for 240 hours. By x-ray analysis, coated sample 5 of this invention was found to have $ZrO_2$ present in substantially the tetragonal and cubic phases even after being exposed to 950° C. for 240 hours. Contrary to this, the prior art Sample 3 coating after being heated to 950° C. had only 7% of the $ZrO_2$ present in the tetragonal and cubic phases thereby indicating the instability of the coatings.

TABLE 2

| Sample | Coating on Roll | Condition of Coating After Thermal Cycle | Tetragonal and Cubic Phases of $ZrO_2$ (Percent) |
| --- | --- | --- | --- |
| 1 as coated | 50 ($ZrSiO_4$) + | No spalling after | 92% |

TABLE 2-continued

| Sample | Coating on Roll | Condition of Coating After Thermal Cycle | Tetragonal and Cubic Phases of $ZrO_2$ (Percent) |
|---|---|---|---|
| | 50 ($ZrO_2$. 5% CaO) | 20 | |
| 2 Heat treatment at 950° C. for 50 hrs. | 50 ($ZrSiO_4$) + 50 ($ZrO_2$. 5% CaO) | No Spalling after 20 cycles | 54% |
| 3 Heat treated at 950° F. for 240 hr. | 50 ($ZrSiO_4$) + 50 ($ZrO_2$. 5% CaO) | Chipping after one cycle | 7% |
| 4 (as coated) | 50 ($ZrSiO_4$ + 10% $Y_2O_3$) + 50 ($ZrO_4$.14% $Y_2O_3$) | No spalling after 20 cycles | 90% |
| 5 Heat treated at 950° C. for 240 hrs. | 50 ($ZrSiO_4$ + 10% $Y_2O_3$) + 50 ($ZrO_2$.14% $Y_2O_3$) | No spalling after 20 cycles | 88% |

*All samples substrates were austenitic stainless steel. All samples had an undercoat consisting of a cobalt-base alloy with about 50 volume percent alumina about 0.1 mm thick. The outer coatings were about 0.06 mm thick.

What is claimed is:

1. A process for forming a pick-up, wear, thermal shock resistant refractory coating on a substrate comprising the steps:
   (a) forming a powder feed by mixing zircon combined with at least one selected oxide from the group consisting of calcia, yttria, magnesia, hafnia, and a rare earth oxide with particles of zirconia at least partially stabilized with at least one stabilizing oxide selected from the group consisting of calcia, yttria, magnesia, ceria, hafnia and a rare earth oxide to form a substantially homogeneous mixture; and
   (b) thermally depositing said powder feed onto the substrate to form a coating composed of $ZrO_2$ substantially in the cubic and tetragonal phases along with said stabilizing oxide, zircon and the selected oxide combined with the zircon.

2. The process of claim 1 wherein prior to forming the powder feed, particles of said zircon or said selected oxide are coated with an adhesive and then mixed so that the particles of said selected oxide adhere to the surface of the particles of said zirconia.

3. The process of claim 2 wherein the particles of the selected oxide are smaller than the particles of zircon so that a plurality of particles of the selected oxide adhere to the surface of the particles of zircon.

4. The process of claim 1 wherein prior to forming the powder feed, particles, said zircon and selected oxide are melted, cast, and crushed to form a powder of zirconia combined with said selected oxide.

5. The process of claim 1 wherein prior to forming the powder feed, particles, said zircon and selected oxide are blended, sintered, and crushed to form a powder of zirconia combined with said selected oxide.

6. The process of claim 1 wherein the selected oxide is yttria and the stabilizing oxide is yttria.

7. The process of claim 1 wherein said powder feed comprises 30 to 90 weight percent stabilized zirconia and the balance essentially zircon with the selected oxide.

8. The process of claim 1 wherein the substrate is metal and prior to step (b) the following step is added;
   (b') depositing an undercoat of metallic or cermet upon said metal substrate.

9. The process of claim 1 wherein said undercoat is a cobalt-based metal matrix comprising Co—r—Al—Ta—Y and $Al_2O_3$.

10. The process of claim 1 wherein in step (b) the powder feed composition is deposited on the substrate using a plasma torch.

11. The process of claim 1 wherein in step (b) the powder feed composition is deposited on the substrate using a detonation gun.

* * * * *

UNITED STATES PATENT AND TRADEMARK OFFICE
CERTIFICATE OF CORRECTION

PATENT NO. : 5,418,015
DATED : May 23, 1995
INVENTOR(S) : Jackson, et al.

It is certified that error appears in the above-identified patent and that said Letters Patent is hereby corrected as shown below:

Column 8,
In claim 9, lines 2-3, delete "Co--r--Al--Ta--Y" and substitute therefor --Co-Cr-Al-Ta-Y--.

Signed and Sealed this

Tenth Day of October, 1995

*Attest:*

BRUCE LEHMAN

*Attesting Officer*   *Commissioner of Patents and Trademarks*